Dec. 22, 1970   W. T. BIRGE ETAL   3,549,210
SKID CONTROL SYSTEM
Filed Feb. 14, 1969
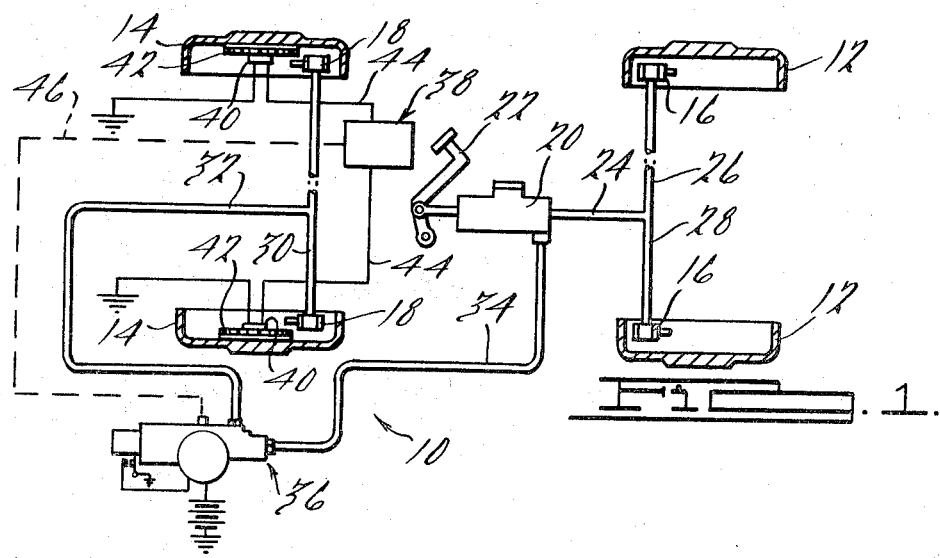
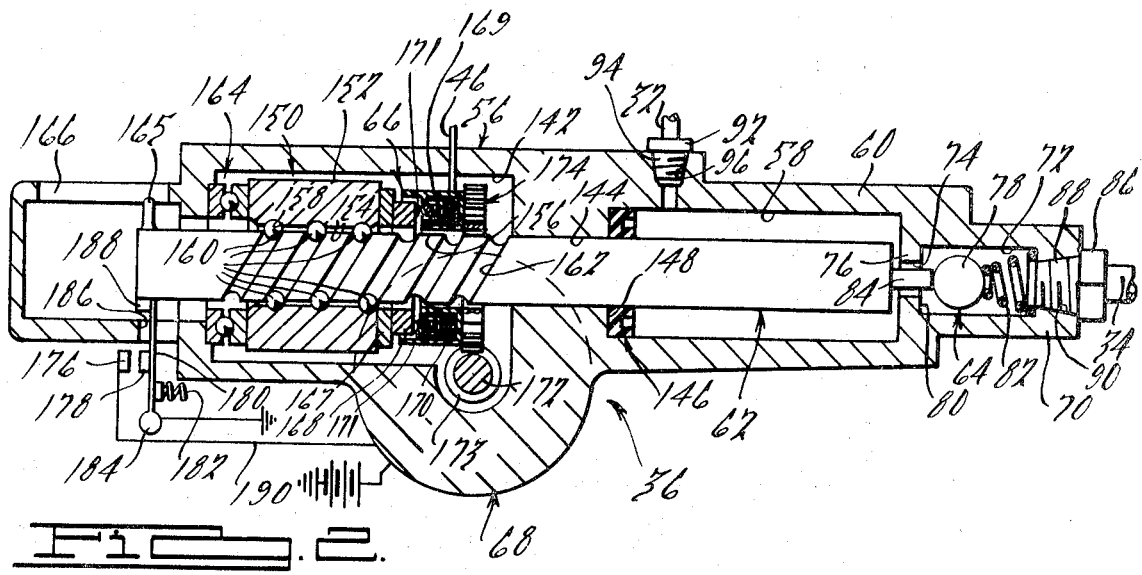
INVENTORS
William T. Birge,
BY David T. Ayers.
Harness, Dickey & Pierce
ATTORNEYS United States Patent Office 3,549,210
Patented Dec. 22, 1970

3,549,210
SKID CONTROL SYSTEM
William T. Birge, Plymouth, and David T. Ayers, Birmingham, Mich., assignors to Kelsey-Hayes Company, Romulus, Mich., a corporation of Delaware
Filed Feb. 14, 1969, Ser. No. 799,388
Int. Cl. B60t 8/12
U.S. Cl. 303—21
10 Claims

ABSTRACT OF THE DISCLOSURE

A skid control system adapted for operative association with the fluid actuated braking system of an automotive or similar type vehicle; the system including a modulating valve assembly for selectively controlling the flow or supply of hydraulic brake actuating fluid between the master brake cylinder of the vehicle and one or more of the wheel cylinders thereof; the modulating valve assembly including an electrically energized clutch assembly and an electric motor cooperable with the clutch assembly in selectively positioning an associated piston member which functions to selectively control the flow of hydraulic brake actuating fluid from the master cylinder to the wheel cylinders.

BACKGROUND OF THE INVENTION

Under certain road conditions, application of maximum braking pressure, and frequently less than maximum pressure, of automobile and similar type vehicular braking systems, results in skidding and a locked-in wheel and/or skid condition. It is, of course, well established that if the wheels of a vehicle are locked or are skidding excessively, the coefficient of friction between the vehicle wheels and the surface of the road over which the vehicle is traveling is reduced, and the effectiveness of the vehicle braking system in decelerating and stopping the vehicle can be substantially reduced. This is especially true for low coefficient of friction road surfaces. It has been theorized that the maximum coefficent of friction, and hence the optimum braking efficiency can be achieved when the vehicle wheels, instead of being in a totally locked or non-rotatable condition, are permitted to slip or partially rotate between 10 and 20 percent, with such wheel slip being defined as the ratio of difference between the velocity of the car $V_c$ and the brake wheel velocity $V_w$ with respect to the car velocity $V_c$, i.e., $V_c-V_w/V_c$.

Generally speaking, the present invention relates to a vehicle skid control system which is adapted to function in selectively controlling the vehicle braking system such that the operative characteristics simulate, as closely as possible, the ideal braking pressure at which the vehicle may be decelerated and stopped in the minimum amount of time. Accordingly, it is a general function of the skid control system of the present invention to provide a controlled amount of wheel slippage during braking and to positively prevent locked wheel conditions from occurring upon application of maximum braking pressure by the vehicle operator. The skid control system of the present invention achieves such optimum braking characteristics through the utilization of a novel control or modulating valve assembly which functions to selectively control the flow of hydraulic brake actuating fluid from the master cylinder of the vehicle braking system to the various brake wheel cylinders. The modulating valve assembly utilizes novel electrically energized clutch and motor mechanisms for effecting energization thereof, which mechanisms are operable in response to an electrical signal transmitted from a control module which receives information concerning the condition of the vehicle wheels.

SUMMARY OF THE INVENTION

This invention relates generally to vehicular skid control systems and, more particularly, to a new and improved skid control system incorporating a novel control or modulating valve assembly.

It is, accordingly, a general object of the present invention to provide a new and improved vehicular skid control system for controlling the braking system of automotive and similar type vehicles.

It is a more particular object of the present invention to provide a new and improved skid control system which utilizes a regulating or control valve having an electrically energized actuating mechanism therein.

It is yet a more particular object of the present invention to provide a modulating or control valve of the above character wherein the actuating mechanism comprises an electrically energized clutch and motor which are adapted to cooperate with an associated ball-screw mechanism for effecting selective actuation of an associated valve and piston arrangement.

It is a further object of the present invention to provide a new and improved skid control system of the above character which is of a relatively simple design, and hence will have a long effective operational life.

Other objects and advantages of the present invention will become apparent from the following detailed description taken in conjunction with the accompanying drawing.

BRIEF DESCRIPTION OF THE DRAWING

FIG. 1 is a schematic diagram of the skid control system embodying the principles of the present invention, and FIG. 2 is an enlarged cross sectional view of the modulating valve assembly incorporated in the skid control system of the present invention.

DETAILED DESCRIPTION OF A PREFERRED EMBODIMENT

General description of environment and function

Generally speaking, FIG. 1 is a schematic diagram of the skid control system, generally designated by the numeral 10, embodying the principles of the present invention and shown in operative association with a vehicular braking system including front and rear brake drums 12 and 14 and associated front and rear brake cylinders 16 and 18, respectively. The skid control system 10 of the present invention, although being adapted to be operatively associated with either pair of front and rear wheel cylinders 16 and 18, or with pairs thereof, for purposes of simplicity of description of the present invention, the system 10 will be shown and described in operative association with only the rear wheel cylinders 18 of the vehicular braking system shown in FIG. 1. It will, of course, be also noted that the skid control system 10 of the present invention may be readily utilized in connection with various types of braking systems other than the vehicular braking system shown in FIG. 1, and may also find particularly useful application, for example, in aircraft braking systems of the type well known in the art.

The aforementioned vehicular braking system also comprises a master cylinder assembly 20 which is operable in response to actuation of a conventional foot or brake pedal 22 to communicate hydraulic braking fluid therefrom through fluid conduits or lines 24, 26 and 28 to the front wheel cylinder 16. The rear wheel cylinders 18 are operatively connected by means of a common fluid conduit 30 which is in turn connected through another fluid conduit 32 to the skid control system 10 of the present invention. The master cylinder 20 is also connected to the skid control system 10 through a suitable fluid conduit or line 34, as illustrated in FIG. 1 and as will be described in detail. It will be noted that the vehicle brakes associated with the brake drums 12 and 14 may be of any conventional design, the construction and operation of which are well known in the art and hence the details thereof have been omitted for purposes of simplicity of description.

The skid control system 10 of the present invention comprises a modulating valve assembly, generally designated 36, that is actuatable in accordance with and in response to an electrical control signal produced by an electrical control module 38. The module 38 receives information from suitable means, such as sensors 40 associated with each of the brake drums 14, for example, through suitable exciter rings 42. The exciter rings 42 and sensors 40 may be of any construction well known in the art, and since these members constitute no material part of the present invention, the specific details concerning the construction and operation thereof have been omitted. By way of example, the exciter rings may be of a toothed construction, and the sensors 40 may be of a permanent or electromagnetic construction which together define a variable reluctance pickup. During normal operation of the associated vehicle, the exciter rings 42 would be rotated concomitantly with the brake drums 14, and hence simultaneously with the associated vehicle wheels, and by virtue of their toothed construction, the rings 42 would, via the sensors 40, produce electrical signals which are transmitted through associated conductors 44 to the control module 38, thus providing a signal to the module 38 responsive to the rotational velocity of the vehicle wheels associated with the brake drums 14.

The control module 38 is designed and constructed to sense the rate of change in the signals received through the conductors 44, and hence to sense the rate of deceleration of the wheels associated with the brake drums 14, and to produce an output signal responsive to the magnitude of the deceleration of the wheels associated with the drum 14 reaching a preselected magnitude corresponding to a skid condition existing or to be occurring at said wheels. The output or control signal is adapted to be transmitted from the control module 38 through a suitable conductor 46 to the modulating valve assembly 36. In the system of the present invention, the control module 38 can provide merely an "on" or "off" signal and modulation of the fluid pressure to the brake cylinders 18 will be provided by the valve assembly 36. It will be noted that in some skid control systems, the fluid pressure to the vehicle brakes is varied in response to an output signal of varying magnitude; however, in the present invention, the fluid pressure is varied or controlled by the valve assembly 36 in response to a signal of substantially constant amplitude which permits the remainder of the system to be considerably simplified.

Construction and operation of modulating valve assembly

For purposes of clarity, the terms "inwardly," "outwardly," and derivatives thereof will have reference to the geometric center of the modulating valve assembly 36 of the present invention and the various component parts thereof. Similarly, the terms "forwardly," "rearwardly" and the like, will have reference to the assembly 36 as shown in FIG. 2, with the forward and rearward ends thereof being located at the right and left sides, respectively, of this figure.

In general, the modulating valve assembly 36 comprises an external housing 56 which defines an elongated, generally cylindrically shaped hydraulic fluid chamber 58 within a generally cylindrically shaped section 60 at the forward end thereof. The housing section 60 is provided with an elongated, longitudinally slidable hydraulic piston 62 that is disposed centrally within the chamber 58 and adapted to cooperate with a check valve assembly, generally designated 64, located at the forward end of the housing section 60. The housing 56 is provided with an electrically energized clutch mechanism, generally designated 66, and with an electrically energized drive motor, generally designated 68, which are adapted to cooperate in controlling longitudinal movement of the piston 62 in response to the output signal produced by the control module 38. More particularly, when the module 38 produces an output signal indicating a skid condition, the clutch mechanism 66 is energized, which causes the piston 62 to retract or move rearwardly. As the piston 62 thus moves, the volume within the chamber 58 increases, and the check valve assembly 64 moves to a closed condition, thereby precluding any further application of the master cylinder brake pressure to the rear brake cylinders 18 and hence to the wheels being skid controlled. The brake cylinder pressure, which has already been built up within the cylinders 18 will be relieved by flowing into the increased volume created in the chamber 58 by the aforesaid movement of the piston 62. With such relief of the brake cylinder pressure, the associated wheels are free to spin up or increase in speed, until such time as the control module 38 deenergizes the clutch mechanism 66, at which time the drive motor 68 effects forward movement of the piston 62 resulting in the check valve assembly 64 being opened, whereby the master cylinder brake pressure will again be applied through the modulating valve assembly 36 directly to the brake cylinders 18.

Referring now in detail to the construction of the modulating valve assembly 36, and in particular to the cylindrical housing section 60 thereof, as illustrated in FIG. 2, the housing section 60 is formed with a forwardly projecting, reduced diameter valve housing portion 70 which defines a generally cylindrically shaped valve chamber 72 therewithin. The chamber 72 is communicable with the interior of the chamber 58 through an annular bore 74 defined by a radially inwardly projecting shoulder 76 provided between the chambers 58, 72. The check valve assembly 64 is disposed within the chamber 72 and comprises a spherical valve member 78 which is slightly smaller in diameter than the chamber 72. The valve member 78 is adapted to be seated or engaged with an annular face 80 defined around the forward side of the shoulder 76 to block communication between the chambers 72, 58, by means of a helical valve spring 82 which abuts at one end against the forward end of the chamber 72. The opposite end of the spring 82 will be seen to bear directly upon the forward side of the valve member 78. The piston 62 is adapted to unseat or effect forward movement of the valve member 78 through the provision of a reduced diameter valve engaging portion 84 projecting from the forward end thereof. The portion 84 is spaced radially inwardly from the periphery of the bore 74 so that when the piston 62 is in an extended position, as indicated in FIG. 2, such that the valve member 78 is biased out of engagement from the face 80 of the shoulder 76, free fluid flow is provided from the chamber 72 to the chamber 58 through the annulus defined between the outer periphery of the portion 84 and inner periphery of the bore 74.

The housing section 70 is communicable with the master cylinder 20 through the fluid conduit 34 that is attached by means of a suitable fluid fitting 86 to the forward end of the housing 56 by having a rearwardly extending, externally threaded mounting portion 88 thereof threadably received within a suitable bore 90 arranged coaxially of the chamber 72 and communicable with the forward end thereof. Similarly, the fluid line or conduit 32 is connected in fluid communication with the chamber 58 through suitable fluid fitting means 92 having a mounting section 94 threadably received within a suitable bore 96 that extends upwardly from and is communicable with the chamber 58. Hence, fluid to the brake cylinders 18 must pass from the conduit 34, through the interior of the chambers 72, 58, and finally outwardly through the bore 96, fitting means 92 and conduit 32.

In a normally deactuated condition of the modulating valve 36, the piston 62 is advanced, as shown in FIG. 2, thereby maintaining the valve member 78 disengaged from the face 80 against the resistance of the spring 82, thereby providing for free fluid communication from the conduit 34 to the conduit 32 in order to permit normal braking of the associated vehicle. Upon the occurrence of a skid condition, whereby a skid control output signal is received from the control module 38, the piston 62 is moved rearwardly within the chamber 58, resulting in the spring 82 biasing the valve member 78 into engagement with the face 80 to block fluid communication from the chamber 72 to the chamber 58, thereby precluding fluid from being communicated to the master cylinder 20 to the rear brake cylinders 18. At the termination of the control signal, the piston 62 is biased forwardly to a position unseating the valve member 78, thereby resuming free fluid flow of hydraulic actuating fluid to the brake cylinder 18.

The rearward end of the housing 56 is formed with an internal cavity or chamber 142 which is communicable through a bore 144 with the chamber 58. The bore 144 is adapted to support the piston 62 for longitudinal sliding movement, and a suitable fluid seal 146 is provided adjacent a radially inwardly extending shoulder 148 defined at the rearward end of the chamber 58 circumjacent the bore 144, the seal 146 functioning to prevent fluid within the chamber 58 from passing into the chamber 142, as will be apparent. Disposed within the chamber 142 is an operating means for effecting preselected longitudinal or forward and rearward movement of the piston 62 and is preferably in the form of a ball-screw mechanism, generally designated 150, which comprises a ball-screw nut 152 having a central, longitudinally extending bore 154 through which the rearward end of the piston 62 extends. The nut 152 is disposed immediately rearwardly of the clutch mechanism 66 which also defines a central internal bore 156 through which the piston 62 extends. The bore 154 of the nut 152 is formed with a helically arranged recess 158 within which a plurality of spherical drive elements 160 are arranged. The elements 160 are adapted to ride within a helically arranged thread or recess 162 formed around the piston 62 and thereby rotatably interengage the nut 152 with the piston 62, as is conventional in ball-screw arrangements. It will be seen that upon rotation of the nut 152, the piston 62 will be moved either forwardly or rearwardly, and similarly, upon longitudinal movement of the piston 62, the nut 152 will be caused to rotate about the longitudinal axis of the piston 62. An antifriction bearing assembly 164 is provided at the rearward end of the chamber 142 for rotatably supporting the ball-screw nut 152 for rotation thereof upon longitudinal movement of the piston 62. The rearwardmost end of the piston 62 is provided with an upwardly extending dog 165 which is adapted to be received within an elongated slot or recess 166 formed at the rearward end of the housing 56. The dog 165 and slot 166 are adapted to cooperate in permitting the piston 62 to move longitudinally of the housing 56, yet prevent any rotation of the piston 62 relative to the housing 56, as will be apparent.

The clutch mechanism 66 is preferably of the electrically energized type and, as previously mentioned, is connected through the conductor 46 with the control module 38. The mechanism 66 may be of any suitable construction well known in the art and by way of example may comprise a pair of cooperable clutch plates 167 and 168 and a clutch housing 169 that contains a plurality of windings, generally designated 170 which are adapted to be energized upon receipt of a control signal from the module 38 to effect disengagement of the clutch plate 168 from the clutch plate 167. The plate 167 may be fixedly secured to the ball-screw nut 152, and the clutch plate 168 may be normally drivingly engaged therewith by suitable spring means 171 within the housing 169, whereby to prevent rotation of the ball-screw nut 152 during such time as the windings 170 are deenergized. Upon energization of the mechanism 66, as will occur when a control signal is received from the module 38, the clutch plate 168 will be moved longitudinally away from the clutch plate 167 to permit free rotation of the ball-screw nut 152 and hence longitudinal movement of the piston 62. At such time as the control signal is terminated, the spring means 171 will bias the clutch plate 168 into engagement with the plate 167 to preclude relative rotation of the ball-screw nut 152 and longitudinal movement of the piston 62.

The drive motor 68 is provided with an output drive shaft 172 which is arranged at generally right angles with respect to the longitudinal axis of the piston 62. The shaft 172 is provided with a worm gear 173 which is threadably engaged with a drive gear 174 that is operatively secured to the clutch housing 169 so that rotation of the gear 174 during such time as the clutch mechanism 66 is deenergized will result in rotation of the ball-screw nut 152 via the mechanism 66. Thus it will be seen that upon energization of the drive motor 68, the drive shaft 172 thereof will rotate, thereby effecting rotation of the worm gear 173 and drive gear 174, which rotation of the gear 174 will effect rotation of the ball-screw nut 152 when the clutch mechanism 66 is deenergized. This, in turn, results in longitudinal movement of the piston 62, as will be described in connection with the overall operation of the modulating valve 36.

The modulating valve assembly 36 is provided with control means in the form of a pair of electrical terminals 176 and 178, the latter of which is mounted on a pivotably disposed member 180 that is biased by a spring 182 in a counterclockwise direction in FIG. 2 about a fixed pivot point 184. The upper end of the member 180 extends upwardly through an opening 186 in the rearward end of the housing 56 and is engageable with a downwardly extending dog 188 on the rearward end of the piston 62. The terminal 178 is connected through the member 180 to a suitable source of electrical current, which current is adapted to be communicated through the terminals 178 and 176 and conductor 190 to the drive motor 68 to effect energization thereof upon engagement of the terminals 176, 178. Briefly, in operation, the dog 188 is designed to maintain the terminal 178 out of engagement with the terminal 176 against the resistance of the spring 182; however, when the piston 62 moves rearwardly, the member 180 is biased under the influence of the spring 182 rearwardly to permit contact of the terminals 176 and 178 and hence energization of the drive motor 68. When the piston 62 subsequently moves forwardly, the dog 188 will bias the upper end of the member 180 in a clockwise direction, thereby disengaging the terminals 176, 178 and deenergizing the drive motor 68.

Operation of the entire system

In operation of the skid control system 10 of the present invention, assuming the initial condition that the various component parts of the valve assembly 36 are as is shown in FIG. 2, at such time as the vehicle brakes are applied under conditions wherein a wheel skid becomes imminent, the control module 38 will transmit a control signal through the conductor 46 to the modulating valve assembly 36. Receipt of this signal by the assembly 36 results in energization of the clutch mechanism 66, with the further result that the clutch plate 168 will become disengaged from the clutch plate 167 and hence permit the free rotation of the ball-screw nut 152. As previously mentioned, when the ball-screw nut is freely rotatable, the piston 62 is free to move longitudinally of the housing 56. Due to the line pressure within the chamber 58, the piston 62 will be biased rearwardly or toward the left in FIG. 2, with the result that the volume within the housing section 60 will increase to relieve the fluid pressure transmitted to the rear wheel cylinders 18, thereby permitting the rear wheels of the vehicle to spin up. Simultaneously, the check valve assembly 64 will be closed, thereby precluding any further application of the master cylinder brake pressure to the wheel cylinders 18. As the piston 62 moves rearwardly, the spring 182 will bias the terminal 178 into engagement with the terminal 176 to complete a circuit to the drive motor 68, resulting in energization of the drive motor 68 and hence rotation of the worm gear 173 and drive gear 174. It will be noted that the piston 62 is normally prevented from moving rearwardly (until energization of the clutch mechanism 66) by the internal frictional resistance or locking action of the clutch mechanism 66 and gears 173, 174, and that the piston 62 therefore cannot move rearwardly until after the clutch mechanism 66 is released.

At such time as the rear wheels of the vehicle have had an opportunity to spin up or rotate to a preselected speed, the control signal from the module 38 to the modulating valve assembly 36 will be terminated, at which time the clutch mechanism 66 will become deenergized, whereby the clutch plate 168 will be biased into engagement with the plate 167 under the influence of the spring means 171. When this occurs, the ball-screw nut 152 is drivingly connected to the drive gear 174, resulting in rotation of the nut 152 and hence longitudinal movement of the piston 62 toward the right or forwardly in FIG. 2, causing pressure to be reapplied to the rear wheel cylinders 18. The piston 62 will continue to move toward the right until the dog 188 biases the member 180 and hence the terminal 178 mounted thereon toward the right or out of engagement with terminal 176, thereby opening the circuit to the drive motor 68 to effect deenergization thereof. Hence the piston 62 will be moved toward the right until such time as the clutch mechanism 66 is reenergized due to a subsequent signal received from the module 38, or until the circuit to the drive motor 68 is opened.

A particularly noteworthy feature of the present invention resides in the fact that as the piston 62 is biased rearwardly under the influence of the brake fluid pressure, the motor 68 will become energized upon engagement of the terminals 176 and 178, resulting in the motor 68 rotating the shaft 172 at its rated output speed preparatory to the clutch mechanism 66 becoming deenergized due to termination of the control signal from the module 38. Therefore, the drive gear 174 will be rotating at a relatively high speed via the worm gear 173 at the instant the clutch mechanism 66 is deenergized, with the result that the ball-screw nut 152 almost instantaneously begins rotating at the rate of rotation of the drive gear 174, thus causing the piston 62 to be rapidly moved toward the right or forwardly into engagement with the valve member 78. With this arrangement, the brake fluid pressure is rapidly reapplied to the rear wheel cylinders 18, and any time delay, which would normally exist if it were necessary to wait for the motor 68 to get up to speed before it could effectively bias the piston 62 to its forward position, is minimized to the extreme.

While it will be apparent that the preferred embodiment illustrated herein is well calculated to fulfill the objects above stated, it will be appreciated that the invention is susceptible to modification, variation and change without departing from the proper scope or fair meaning of the subjoined claims.

We claim:
1. In a skid control system for controlling the fluid pressure applied to the brakes of at least one wheel of a wheeled vehicle from a source of brake actuating fluid,
   a modulating valve assembly comprising,
   pressure control means including piston means movable between actuated and deactuated positions for controlling the magnitude of the pressure of the brake actuating fluid applied to the brakes, and
   actuating means including electrically energized motor means for selectively moving said piston means and electrically energizable clutching means selectively drivingly connecting said motor means with said piston means and actuatable upon receipt of an electrical signal responsive to a skid condition at a wheel on the vehicle being skid controlled.

2. The invention as set forth in claim 1 which includes control means providing an output signal in response to the existence of a skid control at the one wheel, and wherein said clutch means is responsive to the control signal to permit retraction of said piston means.

3. The invention as set forth in claim 2 which includes ball-screw means drivingly connecting said clutch means with said piston means, and wherein said clutch means is normally engaged with said ball-screw means and is disengageable therefrom in response to the control signal.

4. In a skid control system for controlling the fluid pressure applied to the brakes of at least one wheel of a wheeled vehicle from a source of brake actuating fluid,
   a modulating valve assembly comprising,
   pressure control means including piston means movable between actuated and deactuated positions for controlling the magnitude of the pressure of the brake actuating fluid supplied to the brakes,
   said pressure control means having a first condition for relieving the fluid pressure to the brakes and a second condition not relieving the fluid pressure to the brakes, and
   actuating means including electrically energized motor means for moving said piston means between said positions and clutching means actuatable to selectively drivingly connect said motor means with said piston means in response to an electrical control signal.

5. The invention as set forth in claim 4 wherein said motor means is operable to move said piston means to said actuated position wherein said pressure control means is in said second condition.

6. The invention as set forth in claim 5 wherein actuation of said clutching means effects movement of said piston means to a position where said pressure control means is in said first condition.

7. The invention as set forth in claim 4 wherein said piston means is normally maintained in said actuated position at least in part by gear means operatively connecting said motor means with said clutching means.

8. The invention as set forth in claim 4 which includes electrical circuit means for energizing said motor means prior to driving engagement thereof with said piston means through said clutching means whereby said motor means will be rotating at a sufficiently great enough speed to bias said piston means from one of said positions to the other thereof with a minimum amount of time delay once said clutching means has been actuated.

9. In a skid control system for controlling the fluid pressure applied to the brakes of at least one wheel of a wheeled vehicle from a source of brake actuating fluid,
a modulating valve assembly comprising,
pressure control means including piston means movable between actuated and deactuated positions for controlling the magnitude of the pressure of the brake actuating fluid supplied to the brakes,
actuating means including electrically energized motor and electrically energizable clutch means for selectively actuating said piston means and operable in response to an electrical control signal, and
control means including said control signal for selectively energizing said motor and clutch means.

10. The invention as set forth in claim 9 which includes operator means for biasing said piston means, wherein said clutch means is normally engaged with said piston means and is actuable through said operator means, but is disengaged therefrom upon deenergization of said clutch means.

References Cited
UNITED STATES PATENTS 3,231,315  1/1966  Turnbull _____ 303—21X
3,420,580  1/1969  Dymond _____ 303—21

MILTON BUCHLER, Primary Examiner

J. J. McLAUGHLIN, Jr., Assistant Examiner

U.S. Cl. X.R.

188—181; 200—61.46; 303—61